Oct. 27, 1925.
R. GUILLERY
COCK
Filed Dec. 9, 1922
1,558,979
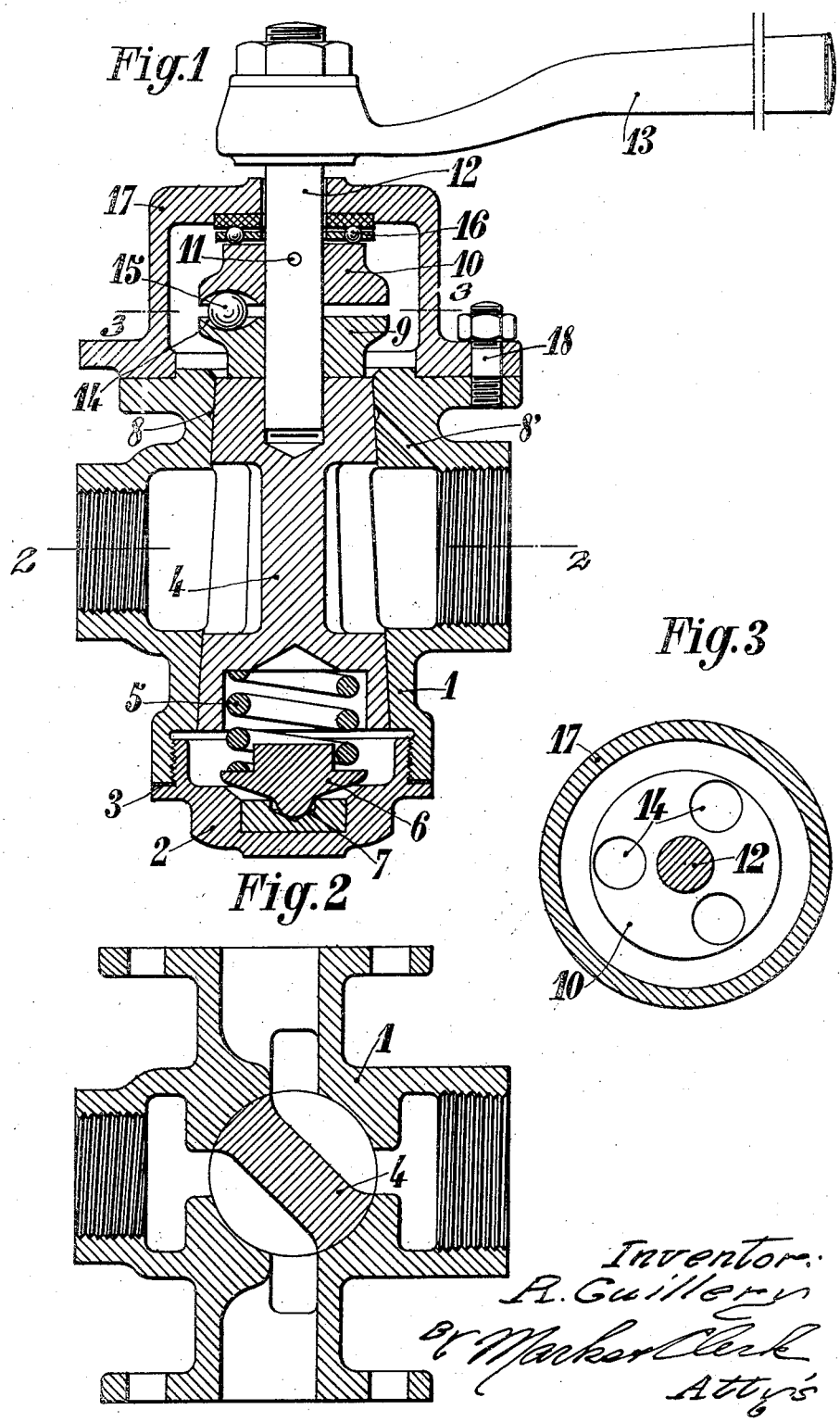

Patented Oct. 27, 1925.

1,558,979

UNITED STATES PATENT OFFICE.

RENÉ GUILLERY, OF PARIS, FRANCE, ASSIGNOR TO ETABLISSEMENTS MALICET & BLIN, OF OUBERVILLIERS, FRANCE.

COCK.

Application filed December 9, 1922. Serial No. 605,920.

*To all whom it may concern:*

Be it known that I, RENÉ GUILLERY, a citizen of the French Republic, residing at Paris, France, have invented new and useful Improvements in Cocks, of which the following is the specification.

The present invention relates to improvements in cocks having a rotary plug.

For obtaining the fluid-tightness of such cocks, the rotary plug must be subjected to a constant pressure directed according to its axis of rotation, adapted to press the said plug against the fixed surface on which it slides, with a sufficient force for preventing leakage along this surface. The constant pressure acting on the rotary plug must obviously increase with the pressure of the fluid, whose flow is interrupted by the cock, but this pressure produces, upon operation of the cock, considerable friction which increases with the said pressure and limits rapidly the value which can be given thereto.

The improvements forming the subject-matter of the invention are adapted to permit the use of a very high pressure acting axially on the rotary member, the operation of the cock, however, remaining easy. The rotary plug is subjected to the action of a powerful resilient member which presses it so tightly against its seat at all times, that there is no leakage between the plug and the shell. The plug is turned by hand and to render this turning movement easy, recesses in the shape of semi-spherical cups are formed in a member rigid with the operating means and in a second member rigid with the plug. Balls are interposed between these members and occupy said cups, and these balls are of less radius than the radius of the cups. Due to this construction, when the operating means is turned, the balls will first move slightly with one of said members until they roll sufficiently far to cause a very powerful axial force on the plug, but this force is sufficient only to substantially counterbalance the pressure of the spring and reduce the friction of the plug against the shell without providing sufficient clearance to permit leakage.

The accompanying drawing illustrates by way of example a form of carrying out the invention.

Figure 1 is a sectional elevation of the cock.

Fig. 2 is a sectional view taken on line 2—2 of Fig. 1.

Fig. 3 is a sectional view taken on line 3—3 of Fig. 1.

The cock illustrated comprises in a known manner a body 1 forming a shell, closed at its lower part by a screw-threaded plug 2 and a packing 3.

The plug 4 of the cock is held tightly pressed in the shell by a powerful spring 5 taking a bearing on a member 6 resting through a spherical head on a bush 7 so as to be capable of turning.

At its upper part, the body 1 is provided with a circular groove 8 for fluid-tightness, connected by the conduit 8' to one of the branches.

A disk 9 is rigidly connected to the plug 4 and a second disk 10 is fixed by means of the pin 11, to the spindle 12 carrying the hand lever 13. The disks 9 and 10 are each provided with semi-spherical cups 14 to receive balls 15 of smaller radius. The disk 10 is prevented from upward movement by a thrust bearing 16, which abuts against a cap 17, secured to the body 1 by the bolts 18.

When rotation is imparted to the spindle 12 and consequently to the disk 10, the frictional resistance at the beginning is too great to allow the plug 4 to participate in this rotation. When however, the disk 10 has been moved a certain distance relatively to the disk 9, the balls 10 transmit to the said plug a powerful axial pressure due to the wedging to which the said balls are subjected when the cups of these balls move relatively to each other. This axial pressure substantially overcomes the resistance of the spring 5 and reduces the friction on the plug 4 sufficiently to allow the plug to turn easily without permitting leakage. As soon as one ceases to act on the lever 13, the spring 5 tightly presses again the plug 4 on the shell 1.

The number of balls 15 may obviously be varied, but the said balls must preferably be arranged at the apices of a regular polygon.

What I claim as my invention and desire to secure by Letters Patent is:

1. In a cock, a shell provided with a frustro-conical bore, a frusto-conical plug filling said bore, a very powerful spring bearing against said plug for tightly forcing the same against the surface of the bore, and means for rotating said plug including elements adapted to exert a powerful pressure on the plug sufficient to substantially counterbalance the pressure exerted by the spring and thus reduce the friction between the plug and bore to permit the plug to readily turn without breaking the contact between the plug and the wall of the bore.

2. In a cock, a ported shell having a frustro-conical bore, a frustro-conical plug arranged in the bore and snugly engaging the surface of the same, a very powerful spring for normally forcing the plug toward the small end of the bore, a disk rigidly connected to the plug, a rotatable spindle coaxial with the plug, a hand lever for turning said spindle, a second disk fixed to the spindle and arranged opposite the first disk, means for preventing the second disk from moving axially away from the plug, the opposite faces of said disk being provided with recesses having curved surfaces, and balls of less radius than said recesses arranged in the recesses and adapted when the hand lever is turned, to first move with the second disk and to afterwards exert a very powerful pressure on the plug sufficient to substantially counterbalance the pressure exerted by the spring and thus reduce the friction between the plug and bore to permit the plug to readily turn without breaking the contact between the plug and the wall of the bore.

3. In a cock, a shell provided with a frustro-conical bore, a frustro-conical plug substantially filling said bore, means for exerting a very powerful pressure against said plug for tightly forcing the same against the surface of the bore, and means for rotating said plug including elements adapted to exert a powerful pressure on the plug sufficient to substantially counterbalance the pressure exerted by the first mentioned means and thus reduce the friction between the plug and bore to permit the plug to readily turn without breaking the contact between the plug and the wall of the bore.

4. In a cock, a ported shell having a frustro conical bore, a frustro conical plug arranged in the bore and snugly engaging the surface of the same, means for exerting a powerful pressure on the plug for normally forcing the latter toward the small end of the bore, a disk rigidly connected to the plug, a rotatable spindle coaxial with the plug, a hand lever for turning said spindle, a second disk fixed to the spindle and arranged opposite the first disk, means for preventing the second disk from moving axially away from the plug, the opposite faces of said disks being provided with substantially semi-spherical recesses, and balls of less radius than said recesses arranged in the latter and adapted when the hand lever is turned, to first move with the second disk and to afterwards exert a very powerful pressure on the plug sufficient to substantially counterbalance the pressure exerted by said means and thus reduce the friction between the plug and bore to permit the plug to readily turn without breaking the contact between the plug and the wall of the bore.

In testimony whereof I affix my signature.

RENÉ GUILLERY.